(12) United States Patent
Geiser (10) Patent No.: US 7,127,353 B2
(45) Date of Patent: Oct. 24, 2006

(54) METHOD AND APPARATUS FOR IMAGING PERMEABILITY PATHWAYS OF GEOLOGIC FLUID RESERVOIRS USING SEISMIC EMISSION TOMOGRAPHY

(75) Inventor: Peter Anderson Geiser, Boulder, CO (US)

(73) Assignee: STRM, LLC, Boulder, CO (US)

( * ) Notice: Subject to any disclaimer, the term of this patent is extended or adjusted under 35 U.S.C. 154(b) by 125 days.

(21) Appl. No.: 10/929,147

(22) Filed: Aug. 27, 2004

(65) Prior Publication Data

US 2006/0047431 A1  Mar. 2, 2006

(51) Int. Cl.
*G01V 1/50* (2006.01)
(52) U.S. Cl. .......................................... 702/13; 702/14
(58) Field of Classification Search ................. 702/13, 702/12, 14, 16; 703/10; 367/73
See application file for complete search history.

(56) References Cited

U.S. PATENT DOCUMENTS

| | | | |
|---|---|---|---|
| 5,377,104 A | 12/1994 | Sorrells et al. | 364/421 |
| 6,389,361 B1 | 5/2002 | Geiser | 702/15 |

OTHER PUBLICATIONS

E. Angerer, S. Crampin, X. Li, and T.L. Davis, "Processing, Modeling and Predicting Time-Lapse Effects of Overpressured Fluid-Injection in a Fractured Reservoir", *Geophysical Journal International*, 2002, pp. 267-280, vol. 149, Royal Astronomical Society, United Kingdom.
S. Baisch and H.P. Harjes, "On the Mechanics of Fluid-Injection Induced Seismicity at KTB", abstract, 2002 conference hosted by the Deutsche Geophysikalische Gesellschaft, abstract located on the internet at http://www.dgg.tu-berlin.de/tagungen/dgg2002/abstracts/BP/Baisch_V.htm.
C.A. Barton, M.D. Zoback, and D. Moos, "Fluid Flow Along Potentially Active Faults in Crystalline Rock," *Geology*, Aug. 1995, pp. 683-686, vol. 23, No. 8, Geological Society of America, United States.
P. Duncan, "Passive Seismic Seeing Active Interest", *Hart's E&P*, Mar. 2004, pp. 47-48, E&P, United States.
L.S. Durham, "Listen: Is it the Next Big Thing?" *Explorer*, Apr. 2003, 5 web pages, American Association of Petroleum Geologists, www.aapg.org, United States.
E. Gaucher and N. Randall, "Microseismic Reservoir Monitoring: What You Should Know To Get Started," *Offshore*, Oct. 1999, pp. 70 and 72, PennWell Corporation, United States.

(Continued)

*Primary Examiner*—Donald McElheny, Jr.
(74) *Attorney, Agent, or Firm*—Holland & Hart LLP (57) ABSTRACT

The application of SET for the imaging and analysis of seismic energy emission induced during production of fluid resources from their reservoirs allows 4 dimensional measurements of the components of the permeability field of the reservoir. The seismic energy emission associated with the permeability field is identified by its spatial and temporal location with respect to a well or plurality of wells in which fluid pressure is being changed. Changing fluid pressure causes seismicity to rapidly migrate outward from the points of fluid pressure change and will alter the characteristics of the seismic energy emission. Monitoring the changes in seismic energy emission in response to pressure changes in the active well and altering the values of the processing parameters permits measurement of components of the permeability tensor. The placement of subsequent infill, development and injection wells may be selected based on the analysis.

21 Claims, 7 Drawing Sheets

OTHER PUBLICATIONS

S. GE and S. Cheree Stover, "Hydrodynamic Response to Strike- and Dip-Slip Faulting in a Half-Space," *Journal of Geophysical Research*, Nov. 10, 2000, pp. 25,513-25,524, vol. 105, No. B11, American Geophysical Union, United States.

L. Goodwin, et al., "The Missing Link: From Earthquakes to Orogenesis," a white paper, Sep. 22-23, 2002, workshop sponsored by the Teutonics Program, Earth Sciences Division, and National Science Foundation (GEO/EAR) in Denver, CO, United States.

S.E. Laubach, J.E. Olson, and J.F.W. Gale, "Are Open Fractures Necessarily Aligned With Maximum Horizontal Stress?" *Earth and Planetary Science Letters*, May 15, 2004, pp. 191-195 (5 pgs of online article), vol. 222, issue 1, Elsevier, B.V., the Netherlands.

S. McGuire and T. Khan, "Can We Use Dynamic Elastic Nonlinearity Measurements of Rocks to Map Reservoir Properties?" *Oil & Gas Journal*, Sep. 10, 2001, 8 pgs of online articles, PennWell Corporation, United States.

C. Neale and P.M. Duncan, "Passive Seismic Uses Nonactive Noise," *The American Gas & Oil Reporter*, Nov. 2003, pp. 68 and 70-73, National Publishers Group Inc., United States.

H. Niitsuma, et al., "Current Status of Seismic and Borehole Measurements for HDR/HWR Development," 1999, 28 pages, a white paper posted on the Tohoku University website at http://www.earth.tohoku.ac.jp/Niitsumalab/mtc_ni-e.html, Japan.

J.M. Ramsey and F.M. Chester, "Hybrid Fracture and the Transition From Extension Fracture to Shear Fracture," *Nature*, Mar. 4, 2004, pp. 63-66, vol. 428, (1 pg online article-first paragraph), Nature Publishing Group, United States and United Kingdom.

E. Rothert and S.A. Shapiro, "Microseismic Reservoir Characterization: Numberical Experiments and Case Studies," 2001, 4pgs of online article, listed in *Expanded Abstracts Historical Series 1982-2003, RC 2* (online location at http://www.seg.org/publications/archive/exAbsHist/), 71st Society of Exploration Geophysicists (SEG) Meeting, San Antonio, United States.

C.H. Scholz, "Good Tidings", *Nature*, Oct. 16, 2003, pp. 670-671, vol. 425, Nature Publishing Group, United States and United Kingdom.

S.A. Shapiro, P. Audigane, and J. Royer, "Large-Scale *in Situ* Permeability Tensor of Rocks From Induced Microseismicity," *Geophysical Journal International*, 1999, pp. 207-213, vol. 137, Royal Astronomical Society, United Kingdom.

C-I. Trifu, D. Angus, and V. Shumila, "A Fast Evaluation of the Seismic Moment Tensor for Induced Seismicity," *Bulletin of the Seismological Society of America*, Dec. 2000, pp. 1521-1527, vol. 90, No. 6, Seismological Society of America, United States.

T.E. Urbancic, S.C. Maxwell, C. Demerling, M. Prince, and R. Zinno, "Mapping Hydraulic Fracture Complexities Using Microseismicity," Jul. 7-10, 2002, 7 pgs, paper presented at 2002 NARMS-TAC (North American Rock Mechanics Symposium-Tunnelling Association of Canada) Conference Proceedings in Toronto, Canada.

D.J. White, et al., "Greenhouse Gas Sequestration in Abandoned Oil Reservoirs: the International Energy Agency Weyburn Pilot Project," *GSA Today*, Jul. 2004, pp. 4-10, vol. 14, No. 7, Geological Society of America, United States.

A. Ziv and A.M. Rubin, "Static Stress Transfer and Earthquake Triggering: No Lower Threshold in Sight?", *Journal of Geophysical Research*, Jun. 10, 2000, pp. 13,631-13,642, vol. 105, No. B6, American Geophysical Union, United States.

METHOD AND APPARATUS FOR IMAGING PERMEABILITY PATHWAYS OF GEOLOGIC FLUID RESERVOIRS USING SEISMIC EMISSION TOMOGRAPHY

FIELD OF INVENTION

This invention relates to the imaging of permeability pathways in the form of fracture and/or fault fairways of underground geologic fluid systems, and, more specifically to the use of array seismic emission tomography (also called passive seismic emission tomography) to monitor variation in seismic energy emission of the fracture and/or fault fairways for determining those fairways that are part of a permeability system of a fluid reservoir.

BACKGROUND

It is well known that the earth's crust contains underground fluid reservoirs. These reservoirs form an important natural resource for major components of our economic systems, e.g. oil, gas, water, etc. Recovery of resources from hydrocarbon reservoirs traditionally averages well below complete recovery, and on average only about 30–35% of the total resource in any given reservoir. Given the importance of oil and gas in our present day economy, an increased recovery of the total resources from oil and gas reservoirs is a major focus of many firms in this industry.

Recovery of these resources is dependent, in part, on knowing the "plumbing" of the reservoirs, i.e. the paths through which the fluid moves and by means of which the fluid can be extracted. In a fluid reservoir the "plumbing system" includes a network of interconnected cracks ("crack network") that can be described as "hydraulically linked," i.e. changes in fluid pressure can be transmitted through them. The character of the hydraulically linked crack network is known as the "reservoir permeability field." Character, as used herein, refers to the shape and distribution of the crack network and the ease with which fluid moves through the network. Determining the character of reservoir permeability fields is the focus of much effort of fluid resource recovery and exploitation. For example, in a resource exploration and production application, the spatial geometry and the variation in flow of the permeability field are major factors in identifying locations and developing drilling plans and strategies for production wells that will yield enhanced production. In the case of hydrocarbons, injector wells are often used to enhance output of production wells. Injector wells are used to inject fluids whose densities differ from that of the hydrocarbons, and thus act to "sweep" the fluid that remains after the initial production phase. A more detailed knowledge of the reservoir permeability field would facilitate more efficient secondary and tertiary recovery in such applications.

Traditional approaches to determining the spatial geometry of permeability fields include the use of "guess and test" methods using reservoir simulators. A "guess and test" method uses largely inferential and sparse information about the permeability field to make a best "guess" as to its full three dimensional character. The "guess" is then "tested" by using measured data on production and injection from the field to test whether the model reproduces the measured data. The efficiency of "guess and test" methods is generally poor, and results in low quality of information relating to the reservoir permeability field.

Some approaches have attempted to determine the spatial geometry of permeability fields by seismic investigations of the geological medium. Such seismic investigations include measurements of time-limited (narrow-time window) determinate signals from artificial or natural sources. It has long been recognized that production from fluid reservoirs can induce seismicity. Attempts have been made to use microseismicity induced by production to gather information regarding fracture systems or the crack network, as well as other information, such as, for example, possible causes of the earthquakes, e.g. pore collapse, fault reactivation, etc. With few exceptions monitoring of this microseismicity has been done with seismometers placed "downhole" in wells adjacent to the study well in order to get as close as possible to the ruptures associated with fluid injection. The "downhole" method is both difficult and expensive to use as it requires either that an appropriate well be available or else that one be drilled. Further the use of downhole seismometers limits observations to within a few hundred meters of the observation well.

Another approach to determine the spatial geometry of permeability fields is described in U.S. Pat. No. 6,389,361, issued on May 14, 2002, which is incorporated by reference herein in its entirety. This patent describes increasing fluid pressure to generate a pressure "wave" at a point in the earth's crust to induce microseismicity and creep in the permeability field and to record this microseismicity and creep to create a map of the permeability field associated with the point of fluid pressure increase. The fluid pressure generates microseismicity and creep because the earth's crust is at a near critical state and responds to small changes in the ambient stress state. The permeability field mapped is close to an actual map of the permeability system. The induced microseismicity extends for kilometers from the point of fluid pressure change. The described mapping technique measures one component of the permeability field, namely the geometry.

In addition to the foregoing, the following sets of observations on secondary hydrocarbon recovery, hydraulically conductive fractures and microseismicity, are of particular importance with regard to the background of the present invention.

1. Rate correlation statistics, maximum compressive directions and rapid response: Heffer et al, (1997, Novel techniques show links between reservoir flow directionality, earth stress, fault structure and geomechanical changes in mature waterfloods, SPE Journal, V. 2, June, pp. 91–98) show that rate of production correlation's between producer and injection wells is directly related to the orientation of the maximum ambient compressive stress direction. Positive correlations (i.e. production increases) are observed between injection and production wells where the line connecting the two wells lies within a sector of arc of from 60 to 90 degrees that is bisected by the local maximum compressive stress. Response times between injector and producer wells has "zero" (less than 1 month) time lag over very large distances (>4.5 kilometers). They note that D'arcyian type diffusive flow cannot explain this phenomena.

2. Hydraulically conductive fractures are critically stressed: Barton et al (1995, Fluid flow along potentially active faults in crystalline rock, Geology, V. 23, no. 8, p. 683–686) demonstrate that critically stressed faults and fractures are those with the highest hydraulic conductivity and that statistically these are conoidally distributed around the maximum stress direction (Barton et al, 1995; FIG. 3).

3. Seismicity induced by fluid pressure changes shows rapid response over large distances: In the earthquake control experiment run at Chevron's Rangely, Colo. field and reported by Raleigh et al (1976, An experiment in earthquake control at Rangely, Colo.; Science, V. 191, p. 1230–1237), microseismicity induced by fluid injection and occuring at distances of up to 3 km from the injection well, were observed to stop within 1 day of shut-in of the injection wells.

4. No lower threshold for earthquake triggering and rupture size: A study of central California seismicity by Ziv and Rubin (2000, Ziv, A. and Rubin, A. M., Static stress transfer and earthquake triggering: No lower threshold in sight?, J. Geophys. Res., 105, B6, 13631–13642) finds no lower limit for the cumulative stress changes at the time of rupture. Further that the time delay between events is proportional to the magnitude of the stress change. This is consistent with the inverse power law relationship between the frequency of rupture events and their magnitude. Thus one may infer that the frequency of events increases as the rupture size decreases and there is no lower limit for rupture size.

None of the above, however, provides sufficient useful information regarding the character of the hydraulically linked crack network. Thus, is would be desirous to develop systems and methods which provide useful information regarding the character of the hydraulically linked crack network.

SUMMARY

The present invention provides a method of using the seismic energy emitted by microseismicity and creep to determine the nature of the interconnected network of openings that define the permeability field of underground reservoirs. Nature, as referred to herein, means the shape of the crack network, the variation of the crack network's shape in space and time, and the ease with which fluid can move through the network over time. The invention does this using a means of imaging the microseismicity and creep associated with fracture and/or fault fairways that form the permeability system of fluid reservoirs. Further by monitoring changes in the seismic emission energy of the fracture and/or fault fairways in response to fluid pressure changes in a given well, the present invention permits the determination of the relative degree of hydraulic communication of different sets of fairways that are in communication with the well. It also permits determination of the relationship of the fracture and/or fault fairways to other elements of the reservoir geology, e.g. rock type, whether part of a fold or fault, etc. This information can be input to reservoir models and other multi-dimensional images for exploration, production, and development thereby improving the potential of recovery of fluid resources from the earth's crust. The information may also be used to provide guidance for the placement of subsequent wells for the purposes of infill and/or development and/or injection.

One aspect of the present invention provides a method for imaging a permeability field of a fluid reservoir. The method comprising the steps of (a) establishing a seismic emission tomography (SET) array operable to acquire seismic energy emission data, the array comprising a plurality of seismic energy sensors; (b) acquiring first seismic energy emission data from the SET array; (c) generating a first image of a volume associated with the array based on the first seismic energy emission data; (d) changing a fluid pressure in an active well in the reservoir to create a fluid pressure wave, the fluid pressure wave causing failures to occur on fractures within a permeability field associated with the well, the failures generating seismic energy emissions; (e) acquiring second seismic energy emission data from the SET array; (f) generating a second image of the volume associated with the array, the second seismic energy emission data including data associated with the failures; and (g) analyzing the images to determine the permeability field of the fluid reservoir. The establishing step comprises, in one embodiment, determining a location of the reservoir; and placing at least three seismic energy sensors at predetermined locations in relation to the reservoir. The establishing step may further comprise connecting the seismic energy sensors to a remote computer. The seismic energy sensors, in an embodiment, comprise a geophone. Changes in fluid pressure may be generated by withdrawing fluid from the active well thereby creating a reduction in the fluid pressure, or by injecting fluid into the active well thereby creating an increase in the fluid pressure.

In an embodiment, the method also includes the steps of: (a) determining a direction of maximum compressive stress of an ambient stress field associated with the reservoir; (b) repeating the step of changing a fluid pressure; (c) acquiring third seismic energy emission data from the SET array; (d) generating a third image of the volume associated with the array, the third seismic energy emission data including data associated with failures generated from the repeating step; (e) analyzing the images to determine a set of fractures and/or faults comprising the permeability field associated with the active well, whereby the permeability field is measured in time and space.

Another aspect of the present invention provides an apparatus for imaging a permeability field of a fluid reservoir. The apparatus comprises: (a) a plurality of seismic energy sensors arranged in a seismic emission tomography (SET) array; and (b) a data processor operatively interconnected with the plurality of seismic energy sensors, wherein the SET array is operable to acquire seismic energy emission data and the data processor is operable to generate an image of the permeability field of a volume associated with the array based on the seismic energy emission data. In one embodiment, the seismic energy emission data comprises a series of magnitudes of seismic energy received at the seismic energy sensor and a time index associated with the series of magnitudes, and the data processor is operable to receive the seismic energy emission data from each of the seismic energy sensors and correlate the seismic energy emission data to at least one fluid pressure wave generated from a change in fluid pressure in an active well in the reservoir. In another embodiment, the data processor is operable to generate a set of multidimensional images of the reservoir permeability field in which each image is temporally separated from the preceding image thereby showing the changes of the permeability field over time.

Another aspect of the present invention provides a method for multidimensional imaging of a permeability field of a fluid reservoir having a plurality of wells comprising the steps of (a) collecting data from a seismic emission tomography (SET) array associated with the fluid reservoir following a fluid pressure change from at least a first well; (b) plotting the data in n-dimensional space to locate at least a second well hydraulically linked to the first well; (c) using at least the second well to generate additional fluid pressure changes; (d) collecting data from the SET array following the additional fluid pressure changes; (e) plotting the data in n-dimensional space to locate at least a third well hydraulically linked to at least one of the first and second wells; (f) combining the information of steps (b) and (d) to continue mapping the permeability field in the n-dimensional space; (g) repeating steps (a) through (f) until all hydraulically linked wells of the reservoir field have been determined; and (h) mapping spatial and temporal characteristics of the permeability field. In an embodiment, the mapping step comprises generating a set of multidimensional images of the spatial and temporal locations of fractures and/or faults within the permeability field and associated permeability values of the permeability field, each multidimensional image temporally separated from the preceding one.

DETAILED DESCRIPTION

Seismic emission tomography (SET), also referred to as array seismic emission tomography (ASET) or passive seismic emission tomography (PSET), falls into the class of emission tomography methods. SET uses seismic emissions collected at a number of monitoring stations to image the object, or media, to which the monitoring stations are mounted. Such an object is, for example, the earth. However, in contrast to classic tomography, SET obtains 3-D images of the microseismic activity of the media by passive seismic antenna scanning of the half-space, rather than by solution of the inverse Radon's problem. Continuous seismic oscillations, like endogenous microseisms, coda and scattering waves, can give information about the structure of the earth. The presence of microseismic sources, or inhomogeneities within the earth, result in the appearance of coherent seismic components in a stochastic wave field recorded on the surface by a seismic array. By careful processing of seismic array data, these coherent components can be used to develop a 3-D model of the microseismic activity of the media or images of the noisy objects. The processing is mainly based on calculations of the relative energy of coherent radiation of spherical waves originating from different points or small volumes below the seismic array.

Seismic emission tomography requires a long record length for accurate spatial resolution. The processing algorithm is based on a linear additive model of signals and noises. A "Semblance" (S) or "Signal/Noise Estimation" (RO) procedure may be used for calculation of the relative energy of coherent radiation. These estimates are very sensitive to the presence of coherent components in the multichannel seismic recording. The set of S (or RO) values calculated for number point (Xi, Yj, Zk) of the scanned volume reflect the spatial distribution of seismic activity (radiated or scattered) of the medium beneath the array.

Microseismicity and creep are the product of a large number of independent parameters. Analysis of multi-parametric phenomena requires the ability to control and directly compare the various parameters. The present invention provides means of systematic collection and analysis of parametric seismic data such as variation in seismic energy emission as a function of time and fluid pressure, maximum seismic energy emission values, P-wave and S-wave component behavior, etc. for assemblage into a single n-dimensional model. Such a model allows direct comparison of one parameter against another in correct spatial and temporal relations and provides a means for direct measurement and mapping of the character of the hydraulically linked permeability field as well as other seismogenic and petrophysical aspects of the reservoir. An example of such a system of data collection, assemblage, and analysis with the results displayed as multi-dimensional images, is Seismo-Tectonic Reservoir Monitoring™ or STRM™ and is described in U.S. Pat. No. 6,389,361. The present invention may provide input for such a system, as well as direct output of four dimensional descriptions of the various seismic parameters found by processing the raw seismic data in terms of variation in the parametric data for characterizing the seismic energy behavior as a function of the permeability seismicity.

Figure 1:
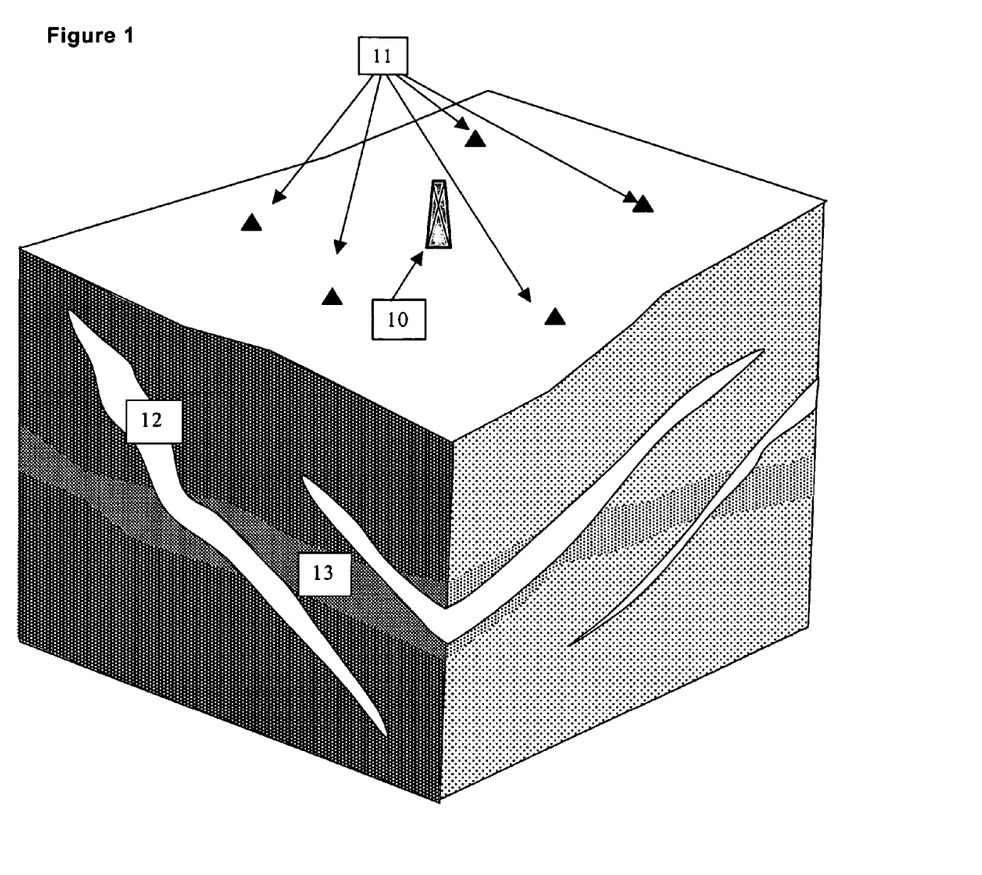
FIG. 1 is a three dimensional schematic illustrating an operating well and a hydraulically linked network.

FIG. 1 is a schematic diagram illustrating a well 10 and network of seismic stations 11 used for seismic emission tomography. One or more fracture/fault fairways 12 intersect a fluid reservoir 13 located beneath the surface of the earth. As is understood, fluid is typically located in the reservoir 13 in relatively small volumes or voids within porous material beneath the surface of the earth. In order to extract fluid from such a reservoir 13, the well 10 must be hydraulically linked to at least a portion of these various fluid volumes, with more efficient the linkage resulting in better well productivity. The hydraulic linkage connecting the fluid volumes is referred to as the permeability field for a reservoir 13. A fracture/fault fairway 12 typically provides a more efficient hydrologic linkage than other areas within a reservoir. A collection of fractures and/or faults may or may not be hydraulically linked to the reservoir permeability field. Hydraulic linkage of a collection of fractures depends on the relation of the fractures/faults to an ambient stress field within the reservoir 13. Thus, a first collection of fractures/faults that has a different relative orientation than a second collection of fractures/faults may not be hydraulically linked to the reservoir permeability field. The collection of fracture/fault sets that have relatively efficient hydraulic linkage to the reservoir permeability field are referred to as fracture/fault fairways. In the embodiment of FIG. 1, the seismic network is used to image the permeability field, and fracture/fault fairways. In this embodiment, microseismicity generated by fluid pressure change causing illumination of the hydraulically linked fractures of the permeability field may be recognized by noting the timing and type of fluid pressure changes in the well, and comparing it with the changing behavior of seismic energy emitted by fracture/fault fairways and associated parts of the permeability field imaged by SET.

In FIG. 1, the well 10 is used to create seismicity by varying fluid pressure within the well, resulting in a fluid pressure change within reservoir. The network of seismic stations 11 is used to gather seismic energy emitted by microseismicity and creep, by which sets of fracture/fault fairways 12 are imaged in terms of their relationship to a fluid reservoir 13. In this embodiment, the network of seismic stations 11 is used to monitor seismic emissions for a period of time. The well 10 is then used to create a perturbation. The perturbation is generated by fluid pressure changes that either reduce fluid pressure by effectively removing fluid from the well 10 (e.g. a flow test), or increase fluid pressure by injecting fluid into the well 10 (e.g. fracing). The network of seismic stations 11 is used to monitor seismic emissions during and after the fluid pressure change. The data from the network of seismic stations 11 is analyzed to map the permeability field associated with the well 10.

Figure 2:
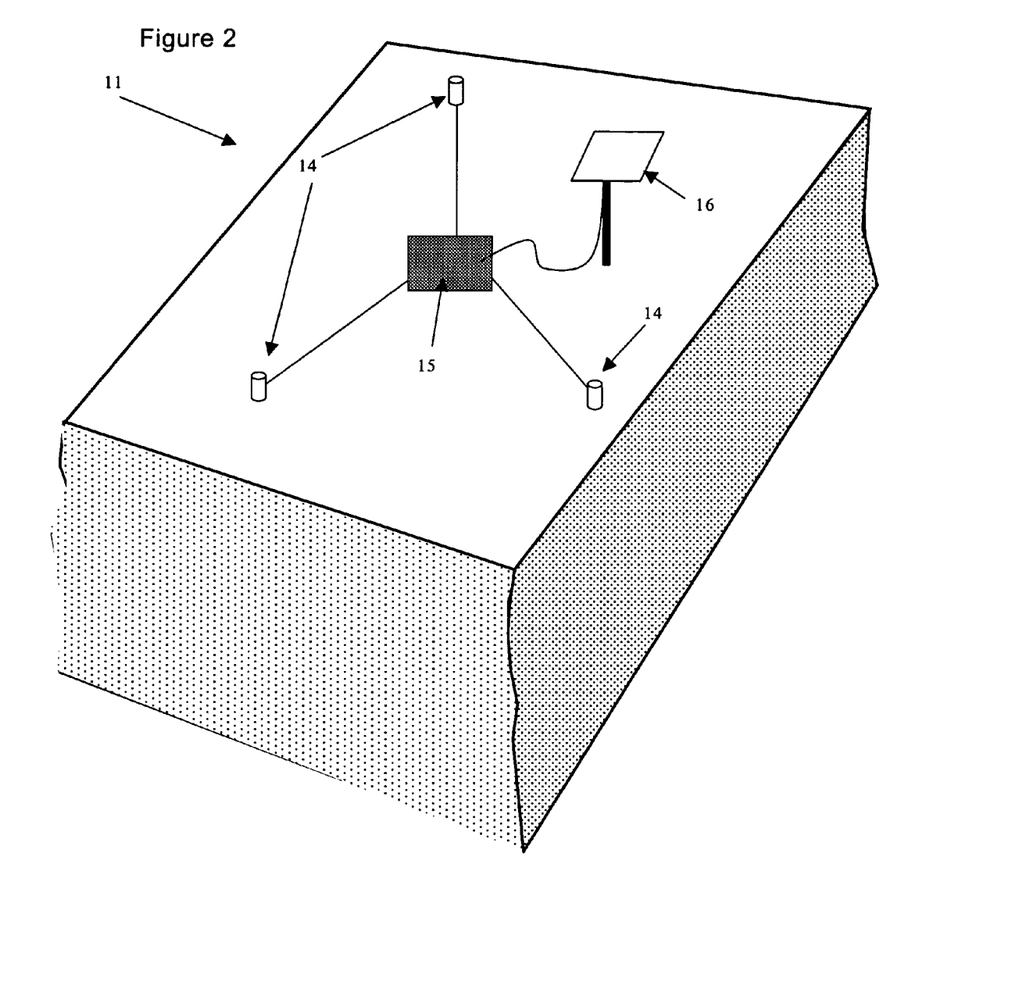
FIG. 2 is a schematic diagram illustrating a typical seismic recording station for seismic emission tomography.

FIG. 2 is a schematic diagram of a typical seismic station micro-array 11 used to create a seismic network to gather the data for SET. As fluid pressure is changed, the hydraulically linked fractures/faults fail elastically, resulting in a set of elastic failures generating seismic energy whose magnitude depends upon the size of the failure. A set of one to three component geophones 14 record seismic waves, and this data is sent to an instrument vault 15 containing a recording device to collect the data. Such recording devices are made by a variety of companies such as Kinemetrics and Reftek, among others. The data collected may then be manually downloaded (e.g. via flash cards, etc.) or sent by telemetry or cable to a central data collection point. The geophones 14 may be placed on the surface of the ground, or placed in a shallow hole. The recording station contains an internal power source, which may be any suitable type of power source and in one embodiment is one or more batteries recharged by solar panels 16. The recording station may also receive power from other sources, such as a power cable from a central source. The geophones 14, in one embodiment, are capable of receiving high frequency input, e.g. greater than about 50 Hz, while the recording device is capable of sampling at about twice the frequency of the geophones 14. The data collected from the network of seismic stations is used for SET.

Figure 3:
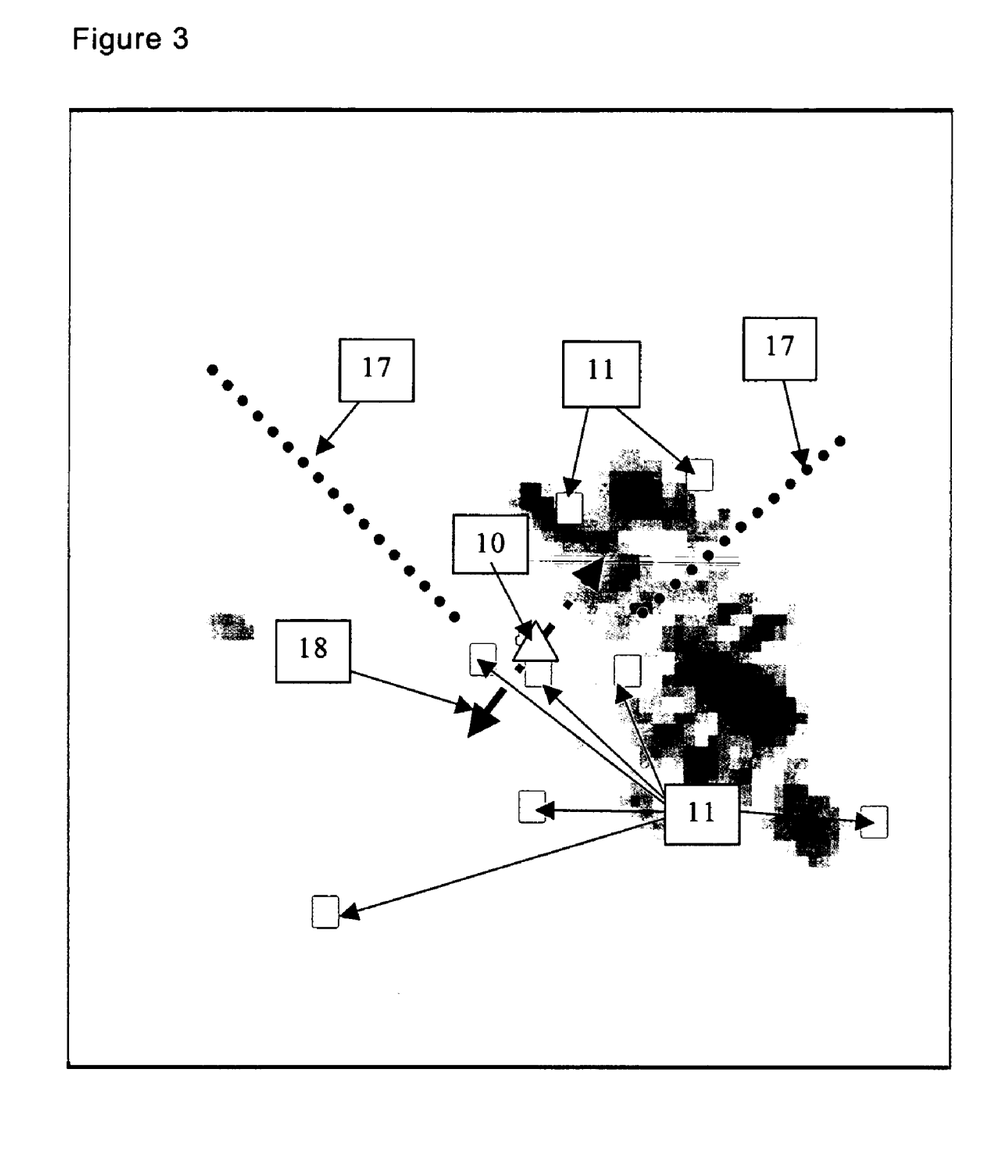
FIG. 3 is an example of an 8×8 kilometer map of fracture/fault fairways expressed as bands of higher seismic energy.
Figure 4A:
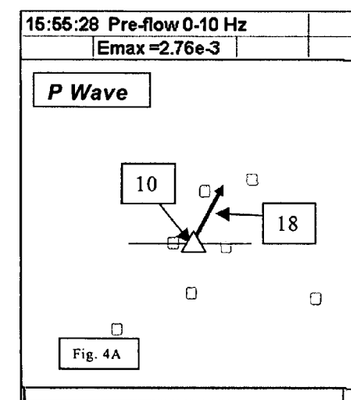
FIG. 4 is an example of three 8×8 kilometer map views of a sequence of three successive 10 second P-wave and S-wave stacks for a 100 m thick slice through the 3D seismic energy volume at the depth of a test horizon.
Figure 4B:
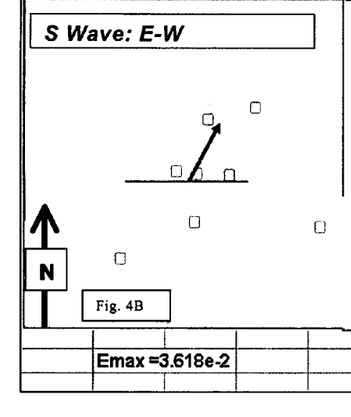
Figure 4C:
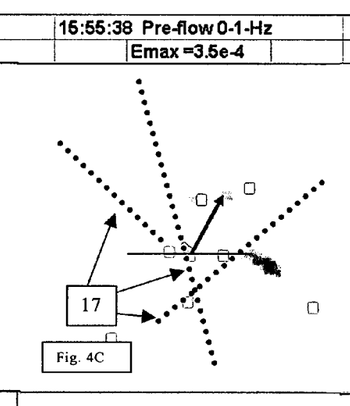
Figure 4D:
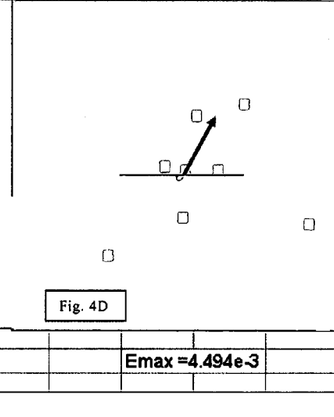
Figure 4E:
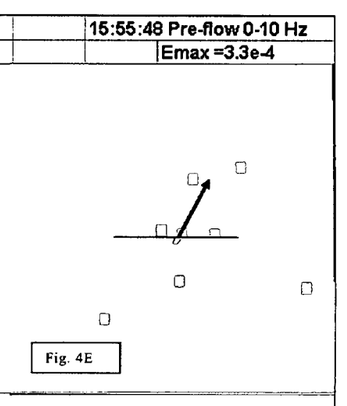
Figure 4F:
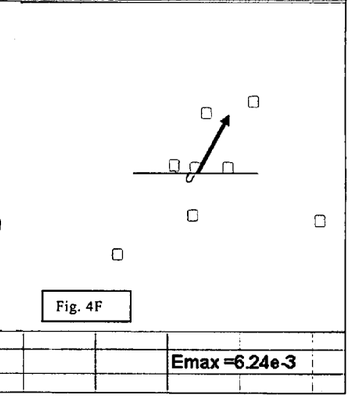
Figure 5A:
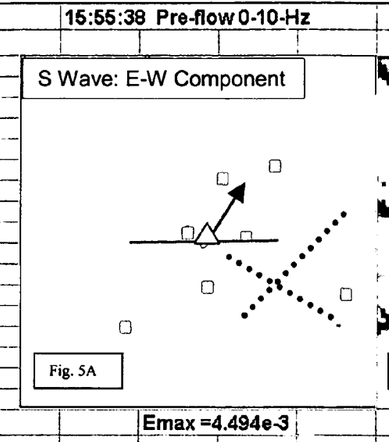
FIG. 5 is an example of an 8×8 kilometer map view of a 100 m thick slice at the reservoir level showing the contrast in behavior of the fracture/fault fairways between the pre-flow (ambient) state and that which occurs during flow (pressure reduction) at the well.
Figure 5B:
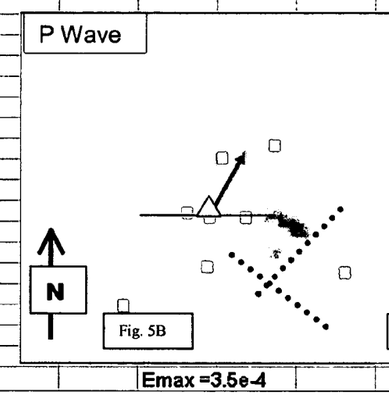
Figure 5C:
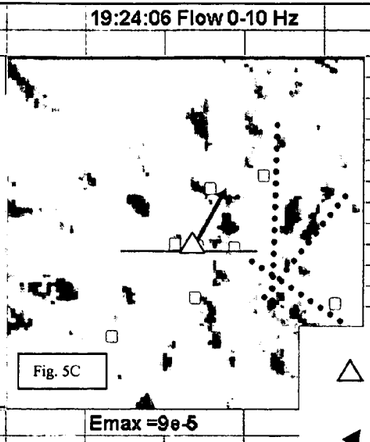
Figure 5D:
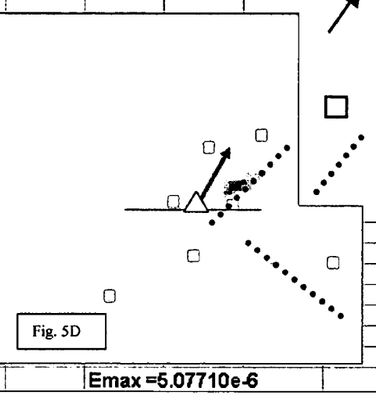

FIG. 3 is an image of an 8×8 km slice of SET imagery generated from data collected at an array of seismic stations 11. North is at the top of the map. The slice shows P-wave energy stacked for a 10 second interval prior to perturbation of the ambient stress field by a change in fluid pressure at the well 10 (FIG. 1). FIG. 3 shows a number of energy bands, the trend and location of which provides the trend and location of the fairways, represented by the dotted lines 17. In this embodiment, the energy displayed is the top 50% of the energy received at the array of seismic stations 11. The spacing of the northwest trending energy bands is greater than the patch of northeast trending bands located to the east of the well 10. The direction of maximum horizontal stress 12 is noted by the arrow at the well 10 being monitored. The map of the seismic energy emission, in this embodiment, is a slice from a cube of the energy emission that is 8×8×5 kilometers. The slice is 100 meters thick and at a depth of 3.5 kilometers, and has a filter of 0–10 Hz.

FIG. 4 is a 8×8 km map view of a 30 second interval of creep activity in three sequential 10 second stacks selected to display the top 50% of the seismic energy emission for each interval using a 0–10 Hz filter. North is at the top of the maps. The figure illustrates the behavior of fracture/fault fairways 12, noted by dotted lines, prior to a flow test (change in fluid pressure) in the well 10. Fracture/fault fairways are identified on the basis of their linear geometry and spatial stability over time. FIG. 4A illustrates P-wave seismic energy emission and FIG. 4B illustrates S-wave E-W component. FIGS. 4A and 4B represent the state of the imaged volume for the first 10 second stack for the P and S waves, respectively. FIG. 4C illustrates P-wave seismic energy emission and FIG. 4D illustrates S-wave E-W component. FIGS. 4C and 4D represent the state of the imaged volume for the second 10 second stack for the P and S waves, respectively. FIG. 4E illustrates P wave seismic energy emission and FIG. 4F illustrates S wave E-W component. FIGS. 4E and 4F represent the state of the imaged volume for the third 10 second stack for the P and S waves, respectively. The orientation of the maximum horizontal compressive stress 12 is noted by the arrow at the well 10 and suggest that the preferred flow directions are to the NE and NNW, while the NW trend is predicted to be unfavorably oriented. The filter applied for these images is 0–10 Hz.

FIG. 5 shows four 8×8 km map views of two 10 second stacks of two 10 second intervals of creep activity selected to display the top 50% of seismic energy emission for each interval using a 0–10 Hz filter. FIG. 5A illustrates P-wave date for the pre-flow state. FIG. 5B illustrates S-wave data for the pre-flow state. FIG. 5C illustrates P-wave data for the flow state. FIG. 5D illustrates S-wave data for the flow state. The images of the pre-flow and flow states are separated by 3 hours, 29 minutes and 28 seconds. As can be observed from the figures, the directions less favorably oriented for failure under Mohr Coulomb conditions are suppressed as indicated by their lower energy values relative to the other trends in the flow state, compared to those they have in the pre-flow state. In contrast, as indicated by their higher relative energy values in the flow state, the more favorably oriented are enhanced relative to the less favorable directions. In addition the maximum seismic energy emission for each of the cubes has decreased by 2 orders of magnitude.

Figures 6A, 6B, 6C:
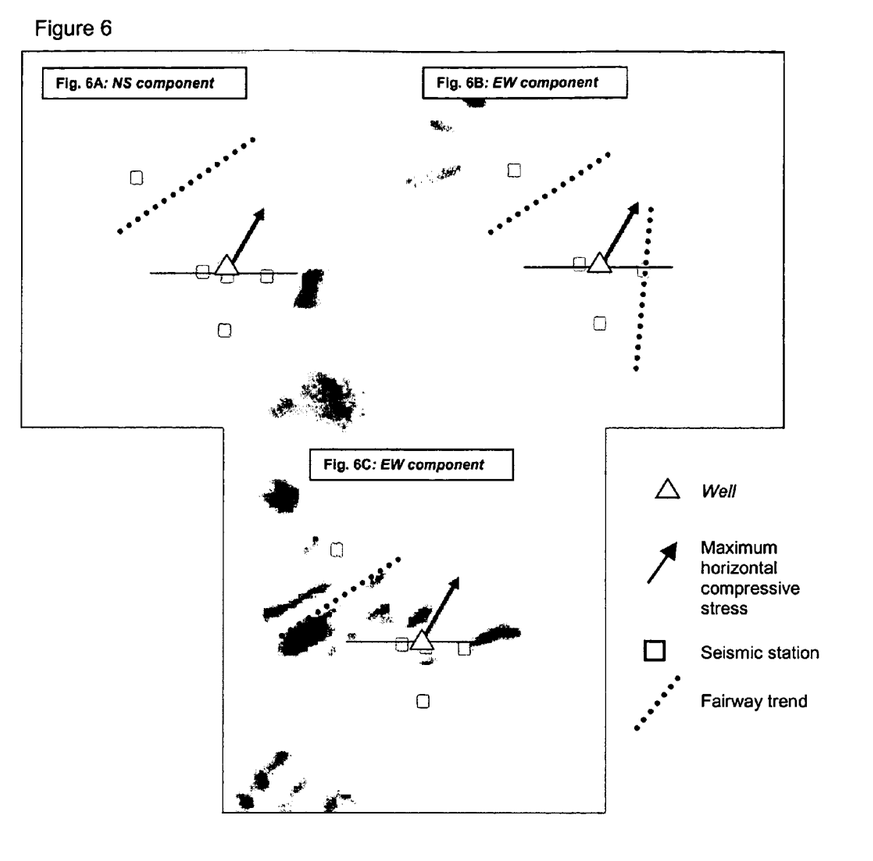
FIG. 6 is an example of a set of three 8×8 kilometer map views of a 100 m thick slice at the reservoir level using a 0–10 Hz filter and viewed at different times and for different percentages of the energy.

FIG. 6 shows an 8×8 km map view of a different reservoir horizon than FIGS. 3, 4 and 5 and shows examples of differences in percent energy display as well as change in flow state and time. The figures show (1) variation in the S-wave seismic energy of the fracture/fault fairways; (2) variation in S-wave component; and (3) use of selection of both processing and seismic energy emission parameters as a means of analyzing permeability seismicity. FIG. 6A illustrates the top 50% seismic energy emission values for the north-south (NS)S-wave component for a 10 second stack interval of the pre-flow state. FIG. 6B illustrates 100% of the energy values of the seismic energy emission of the east-west (EW) S-wave component for the stack interval of 10–20 seconds into flow. FIG. 6C illustrates the top 50–87% of the seismic energy emission values of the east-west (EW) S-wave component for the stack interval of 20–30 seconds into flow.

Observations of FIGS. 3, 4, 5 and 6 reveal that when a fluid pressure differential is maintained at the well, the seismicity of the fracture fairways that constitute the permeability field of the well will be affected by the pressure differential. In general the fairways that form the permeability field are those favorably oriented for failure under Mohr-Coluomb conditions. However as described by Laubach et al [2004, Are open fractures necessarily aligned with maximum horizontal stress?, Earth and Planetary Science Letters, 222, 1, 191–195] this may not always be the case. Likewise the change in seismicity may form a migrating front illuminating the reservoir permeability field associated with the active well, or may selectively cause certain fairways to either increase or decrease their seismic energy emission without forming a recognizable front. In certain applications, maintaining a static fluid pressure may be most effective in revealing the hydraulically linked fractures/faults, however it may also be that pulsing or fluctuating fluid pressure may be desirable or equally as effective in some or all applications.

Figure 7:
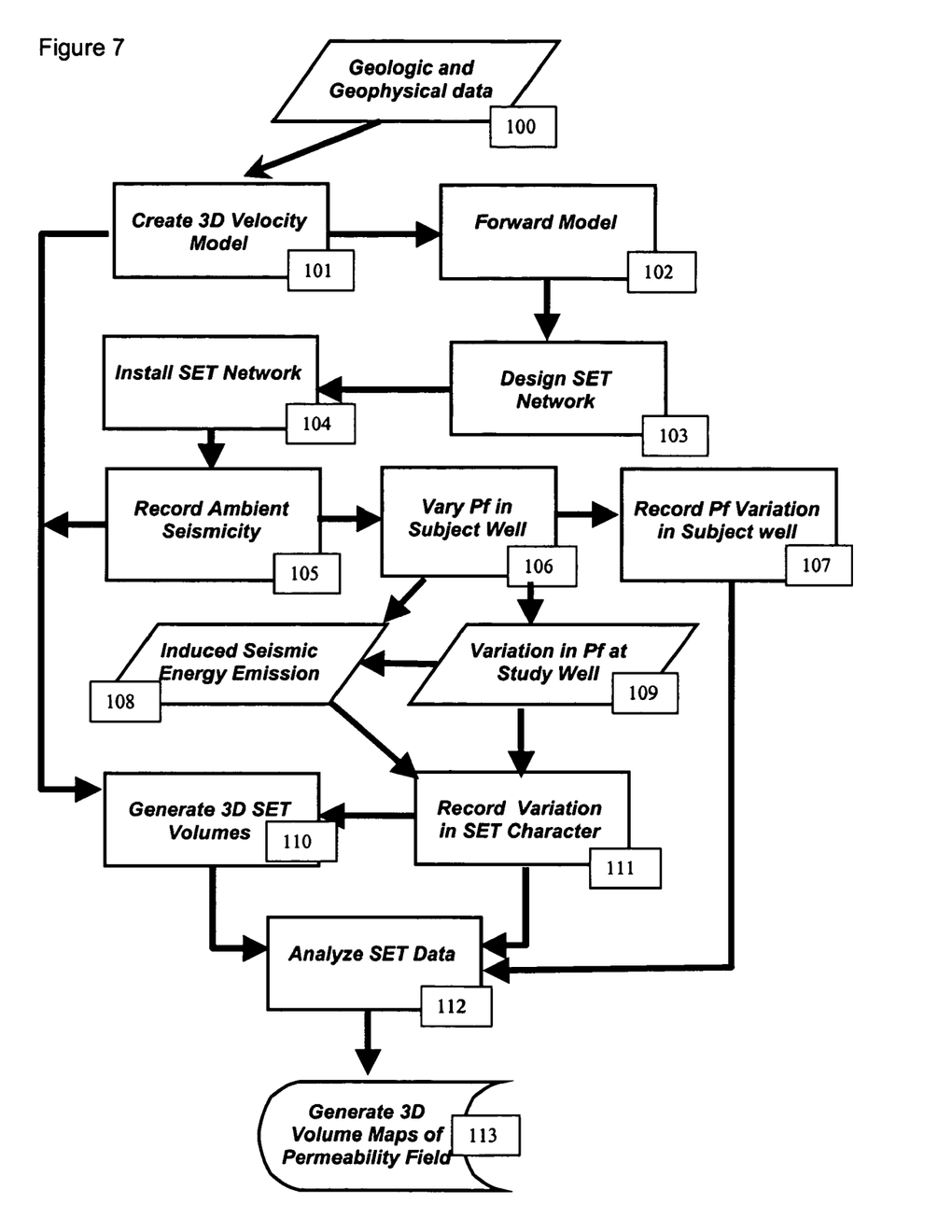
FIG. 7 is a flow chart of the operation of a system using SET for imaging microseismicity and creep induced by changes in fluid pressure at a well.

With reference now to FIG. 7, a flow chart illustration of the operations for generating imagery of permeability fields and fracture/fault fairways of an embodiment of the invention is now described. The system is operable to directly image and analyze the seismic energy being emitted by the permeability field of one or more wells extracting/injecting fluids from/to a reservoir. The results of the analysis are a set of temporally spaced 3D volumes showing the change in behavior of fracture/fault fairways in response to changes in fluid pressure in the study wells. This output may be used as input to either an STRM system, as described in U.S. Pat. No. 6,389,361, or for a reservoir modeling system. Alternatively the output may be used to guide further drilling, infill or enhanced recovery operations.

Starting with the top data box 100 of FIG. 7, geologic and geophysical data are assembled from independent sources. These are independently gathered data used to construct the 3D velocity model. It includes such information as the structural geometry of the study volume and the velocities of the various units within that volume. These data are assembled into a 3D velocity model, as noted at block 101. Alternatively if a pre-existing 3D velocity model is available this step may be omitted. This is the process by which the geologic and geophysical data are converted into a 3D velocity model to be used for forward modeling and processing of the permeability seismicity data. The conversion of the geologic and geophysical data to a 3D velocity model is done by known independent methods embodied by existing software applications (e.g. Geologic Systems's Lithotect™ program).

The 3D velocity model is used to do standard operations such as ray path tracing as part of a forward modeling procedure at block 102. As is understood by those of skill in the art, ray path tracing involves simulating source events in a model and then determining the travel time and signal characteristics of the associated seismic wave at simulated receivers. This process uses known independent methods for ray tracing to examine the characteristics of the 3D velocity model to determine a geometric configuration for the seismic network used to gather the data for SET. At block 103, an effective network configuration is designed for the seismometers used to measure the seismic energy based on the forward model. This process uses known independent methods for designing a geometric configuration for the seismic network stations for SET. Once a design is made, the SET network is installed in the field, as noted at block 104 in preparation for monitoring changes in the seismic energy emission of fracture/fault fairways and any other geological elements of the permeability seismicity that temporally correlate with changes in fluid pressure in the study well. The SET network is installed in the vicinity of the well or wells whose connection to the permeability field is to be mapped. The network consists of seismometers of standard manufacture (e.g. Kinemetrics Inc. K2, etc.). For data collection the instruments may either be independently downloaded to a data collection device, or in communication with a data gathering center via cable, telemetry, and/or any other means of communication.

With the SET network installed a record is made of the ambient seismicity, according to block 105, before any fluid pressure changes are made in the subject well. This serves to find the background or ambient seismicity that occurs without any perturbation of the ambient stress field by fluid pressure fluctuations in the well or wells. It establishes a base level against which subsequent measurements can be compared. The ambient seismicity and 3D velocity model is used to generate a 3D SET volume, as noted at block 110. The data collected by the SET network is processed using known independent methods embodied by existing software applications (e.g. ASET software by V. L. Kiselevich, B. M. Shubik and V. A Gurevich). The output are 3D volumes for successive time intervals where such intervals may range from seconds to hours. The length of the time intervals is selected based on various characteristics of the study volume, including ambient noise, ambient "background" seismicity, and similar factors of the unperturbed steady state conditions of the study volume. If a particular study volume has a relatively high level of ambient noise and background seismicity, the time interval may be reduced compared to a study volume which has relatively low levels of ambient noise and background seismicity. Once the background state is established, fluid pressure (Pf) changes are induced in the well, as indicated at block 106. Fluid pressure changes may be made in the subject well in interval(s) of interest.

At block 107, the Pf variation in the subject well is recorded. This process gathers information on temporal variation in fluid pressure in the subject well through the use of Well Log Records which provide information on the behavior of fluid pressure (Pf) in the well, the interval affected, rate of pressure change, length of time and pressure value, etc. This data is temporally correlated with variation in the seismic energy emission parameters. Variation in fluid pressure (Pf) at the study well propagates through the permeability field of the well generating elastic failure in the crack system that forms the permeability system. The failures generate seismic energy which is recorded by the SET network. As fluid pressure is varied in the well, the character of the various parameters of the seismic energy being emitted by the fracture/fault fairways and other manifestations of permeability seismicity undergo changes. The induced fluid pressure changes of block 106, cause variation in the seismic energy emission of the permeability field, as noted at block 108, which in turn produce variation in the characteristics of the SET parameters. The changes induced by the variation in fluid pressure at the subject well are monitored and recorded, as indicated at block 107. The temporal variation in SET character is compared to the variation in Pf at the study well. As referred to herein, character includes the processing parameters, the behavior of different seismic wave components (i.e. P wave, S wave NS component, etc.), the variation in seismic energy, etc.

The record of variation in the character of the seismic energy emission of block 111 is correlated with the record of Pf variation in the subject well of block 107 and the 3D SET base level generated at block 110, and analyzed at block 112 to invert for components of the permeability tensor. The variation in SET data correlated with changes in Pf at the study well are used to invert for the permeability field geometry as well as scalar components of the permeability tensor. The temporal and spatial distribution of variation in the permeability tensor components are output as 3D volumes according to block 113. The output of block 111 is used to create temporally successive 3D images of the permeability field of the study well(s). The output are 3D volumes for successive time intervals where such intervals may range from seconds to hours. The length of the time intervals is selected based on various characteristics of the study volume, including ambient noise, ambient "background" seismicity, and similar factors of the unperturbed steady state conditions of the study volume, as well as any additional energy sources that may arise from the processes involved in generating the induced pressure changes in the well that may affect the signal/noise ratio, such as gas flaring and pumping operations. These volumes may be used as input to reservoir modeling programs or for STRM analysis as described in U.S. Pat. No. 6,389,361.

The unique temporal and spatial association of the permeability seismicity associated with the permeability field allows the permeability field to be identified both spatially and temporally. Spatially, as described in previously identified U.S. Pat. No. 6,389,361, the permeability seismicity may be located within volumes defined by the ambient maximum compressive stress direction and the location of the injection point on the injection well and/or in fracture/fault fairways which may or may not lie within such volumes. Temporally the permeability seismicity is recognized by the correlation of changes in the character of the SET volumes with changes in fluid pressure at the active well. The permeability seismicity and changes in the seismicity character may rapidly migrate outward from the active well, an example of which is illustrated at FIG. 3. Migration rates may exceed that of D'arcyian flow by 3 to 5 orders of magnitude. The onset of the permeability seismicity is set by the initiation of a change in fluid pressure at the active well 10 of FIG. 1.

Knowledge of the physical characteristics of the reservoir are determined, in an embodiment, by monitoring the following attributes as fluid pressure is varied in the active well:

1. speed of migration of seismicity, used to provide information on the average permeability while variation in the rate of migration indicates relative changes in the permeability field;
2. further relative changes in the permeability field, from monitoring changes in the values of the processing parameters and/or distribution and magnitude of seismic energy emission;
3. the orientation and location of the earthquake slip planes, which enable direct measurement of the geometry of the part of the permeability field controlled by fractures/faults;
4. the orientation of the earthquake slip planes relative to the maximum compressive stress directions (e.g. as plotted on a 3 dimensional Mohr diagram), used to provide information on the rock strength;
5. seismo-tectonic analysis of the earthquake data, used to provide information on structural controls on the permeability;
6. continuous monitoring of microseismicity associated with field production, used to provide information about the evolution of the reservoir; and
7. identification of the microseismicity associated with the permeability field, which acts as a filter for distinguishing other earthquake data sets. It does this by distinguishing their cause from those of the remaining earthquake events.

A model for the operation of the present invention is based upon the observation that the earth's lithosphere is everywhere close to critical failure and that small perturbations (on the order of 1 bar or less) are sufficient to cause failure. The reasoning behind the present invention is that the observations made by various observers demonstrate that there exists a means of rapidly communicating increased fluid pressure over large distances by a non-D'arcyian mechanism. For example, the induced microseismicity observed during the Rangely, Colo. experiment had the same position relative to the injection wells and the maximum compressive stress (i.e. within 45 degrees) as do the positive correlating production and injection wells of Heffer et al. (1997, Novel techniques show links between reservoir flow directionality, earth stress, fault structure and geomechanical changes in mature waterfloods, SPE Journal, V. 2, June 1997, pp. 91–98). Shutting in the wells at Rangely also caused seismicity to cease at distances of up to 4 kilometers from the injection wells within 1 day, consistent with the observations of Heffer et al (ibid.).

Placing these results in the context of the observation that the earth's crust is in a metastable yield condition where stress drops on the order of a few bars or less are associated with microseismicity, indicating that only very small changes in stress state are necessary for failure (2000, Ziv, A. and Rubin, A. M., Static stress transfer and earthquake triggering: No lower threshold in sight?, J. Geophys. Res., 105, B6, 13631–13642), leads the inventor to form the following set of associations:

1. It is known that fluid pressure increases are rapidly propagated throughout a system whose components are in fluid communication. Such a system is referred to herein as "hydraulically linked". The permeability field of a fluid reservoir is an example of a hydraulically linked system.
2. Fluid pressure changes created in a packed off portion of an active well will interact with the maximum compressive stress direction of the ambient stress field and the fracture/fault surfaces whose shear strength and orientation are such that they are critically loaded for failure and hydraulically linked to the packed off section of the active well. The fracture/fault surfaces will respond to the change in fluid pressure by elastic failure. These failures will be reflected as regions of seismic energy emission which will be imaged by SET and thereby serve to map the reservoir permeability field.
3. Altering the SET processing parameters and monitoring variation in seismic energy emission while correlating the behavior of the SET image under the different parametric conditions with changes in fluid pressure at the active well will allow spatial and temporal mapping of the permeability field as well as values of other components of the permeability tensor.

While the foregoing is believed to be a reasonable physical model to explain the operation of the invention, the inventor does not wish to be bound by it.

Accordingly, it can be seen that with the invention described, a means has been provided through the application of Seismic Emission Tomography of direct 4-dimensional measurement and multidimensional imaging and analysis of many, if not all, of the components of the permeability field of a fluid reservoir. This process is referred to as Permeability Seismicity Mapping (PSM). Use of the information provided by PSM can lead to improved efficiency of well placement and field development particularly when used a part of the previously mentioned STRM system. In addition the invention forms a powerful synergistic companion to 4D reflection seismic which can monitor the migration history of the fluid phases as predicted by the permeability field given by PSM. Further, the two systems can potentially be piggy-backed on each other, while holes dedicated to seismometers can be used for supplying additional information (e.g. cross hole tomography, one way travel time for 3D reflection seismology), thus resulting in efficiencies of operation. Finally PSM can provide warning on potential damage to infrastructure and to the reservoir itself arising from the active deformation field.

Although the description of the above embodiments contain many specific details, these should not be construed as limiting the scope of the invention but as merely providing illustrations of some of the presently preferred embodiments of this invention. Various other embodiments are possible within the scope of the present invention.

I claim:

1. A method for imaging hydraulically linked fracture/fault fairways of a permeability field of a fluid reservoir, comprising:
   establishing a seismic emission tomography (SET) array operable to acquire seismic energy emission data, said array comprising a plurality of seismic energy sensors;
   acquiring first seismic energy emission data from said SET array;
   generating a first image of a volume associated with said array based on said first seismic energy emission data;
   changing a fluid pressure in an active well in said reservoir to create a fluid pressure wave, said fluid pressure wave causing failures to occur on fractures/faults within a permeability field associated with said well, said failures generating seismic energy emissions;
   acquiring second seismic energy emission data from said SET array, said second seismic energy emission data including data associated with said failures;
   generating a second image of said volume associated with said array; and
   analyzing said images to determine said hydraulically linked fracture/fault fairways of said permeability field of said fluid reservoir.

2. The method, as claimed in claim 1, wherein said establishing step comprises:
   determining a location of said reservoir; and
   placing at least three seismic energy sensors at predetermined locations in relation to said reservoir.

3. The method, as claimed in claim 2, wherein said establishing step further comprises connecting said seismic energy sensors to a remote computer.

4. The method, as claimed in claim 1, wherein said seismic energy sensors comprise a geophone.

5. The method, as claimed in claim 4, wherein said seismic energy sensors further comprise a recording device.

6. The method, as claimed in claim 1, wherein said acquiring first seismic energy emission data comprises:
   recording seismic energy emissions received at said SET array for a predetermined time period.

7. The method, as claimed in claim 6, wherein said predetermined time period is selected based on at least one of an ambient noise level and an ambient background seismicity.

8. The method, as claimed in claim 1, wherein said acquiring second seismic energy emission data comprises:
   recording seismic energy emissions received at said SET array for a predetermined time period.

9. The method, as claimed in claim 8, wherein said predetermined time period is selected based on at least one of an ambient noise level, an ambient background seismicity, and an energy source associated with said active well.

10. The method, as claimed in claim 1, wherein said changing a fluid pressure step comprises:
    withdrawing fluid from said active well thereby creating a reduction in said fluid pressure.

11. The method, as claimed in claim 1, wherein said changing a fluid pressure step comprises:
    injecting fluid into said active well thereby creating an increase in said fluid pressure.

12. The method, as claimed in claim 1, wherein said analyzing step comprises:
    generating a third image indicating a relative change in seismic energy emission between said first and second seismic energy emission data; and
    analyzing said third image to determine fracture/fault fairways associated with said permeability field.

13. The method, as claimed in claim 1, wherein said analyzing step comprises:
    generating a set of multidimensional images of the reservoir permeability field in which each image is temporally separated from the preceding image thereby showing the changes of the permeability field over time.

14. The method, as claimed in claim 1, further comprising:
    determining a direction of maximum compressive stress of an ambient stress field associated with said reservoir;
    repeating said step of changing a fluid pressure;
    acquiring third seismic energy emission data from said SET array, said third seismic energy emission data including data associated with failures generated from said repeating step;
    generating a third image of said volume associated with said array;
    analyzing said images to determine a set of fractures/faults comprising the permeability field associated with said active well, whereby said permeability field is measured in time and space.

15. A method for multidimensional imaging of a permeability field of a fluid reservoir having a plurality of wells comprising the steps of:
    a. collecting data from a seismic emission tomography (SET) array associated with said fluid reservoir following a fluid pressure change from at least a first well;
    b. plotting said data in n-dimensional space to locate at least a second well hydraulically linked to said first well;
    c. using at least said second well to generate additional fluid pressure changes;
    d. collecting data from said SET array following said additional fluid pressure changes;
    e. plotting said data in n-dimensional space to locate at least a third well hydraulically linked to at least one of said first and second wells;
    f. combining the information of steps (b) and (d) to continue mapping the permeability field in said n-dimensional space;
    g. repeating steps (a) through (f) until all hydraulically linked wells of the reservoir field have been determined; and
    h. mapping spatial and temporal characteristics of the permeability field.

16. The method, as claimed in claim 15, wherein said mapping step comprises:
    generating a set of multidimensional images of the spatial and temporal locations of fractures/faults within said permeability field and associated permeability values of said permeability field, each multidimensional image temporally separated from the preceding one.

17. An apparatus for imaging hydraulically linked fracture/fault fairways of a permeability field of a fluid reservoir through passive seismic emission tomography, comprising:

an active well operatively associated with said fluid reservoir;

a seismic emission tomography (SET) array comprising at least three seismic energy sensors operable to acquire seismic energy emission data and placed at predetermined locations in relation to said fluid reservoir; and a remote computing system operable to receive said seismic energy emission data from each of said seismic energy sensors and generate an image of the fracture/fault fairways of the permeability field of a volume associated with said array based on said seismic energy emission data, wherein said seismic energy emission data comprises a series of magnitudes of seismic energy received at said seismic energy sensors and a time index associated with the series of magnitudes, and wherein said remote computing system is operable to correlate said seismic energy emission data to at least one fluid pressure wave generated from a change in fluid pressure in said active well.

18. The apparatus, as claimed in claim 17, further comprising a network, wherein each of said seismic energy sensors are interconnected to said remote computer through said network.

19. The apparatus, as claimed in claim 17, wherein said seismic energy sensors comprise a geophone.

20. The apparatus, as claimed in claim 17, wherein said seismic energy sensors comprise a geophone and a recording device.

21. The apparatus, as claimed in claim 17, wherein said change in fluid pressure is a reduction in fluid pressure generated by removing fluid from said reservoir.

* * * * *